June 21, 1938.  J. H. ERTER  2,121,218
CONDENSING METHOD AND APPARATUS
Filed March 31, 1934  2 Sheets-Sheet 2
Fig. III.
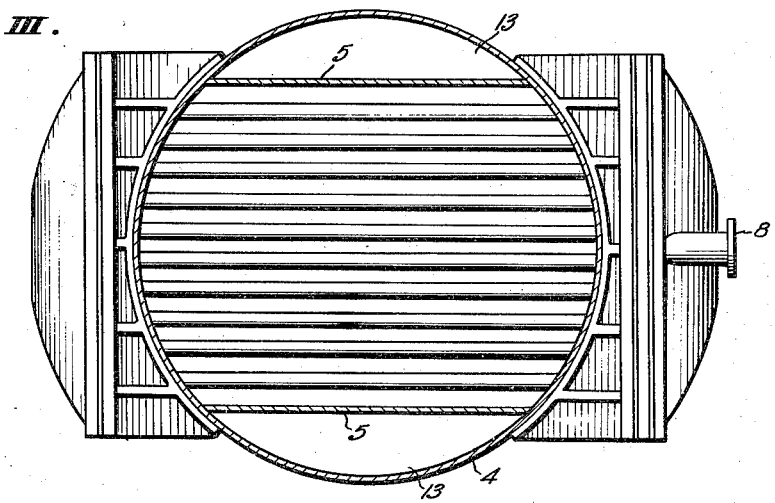
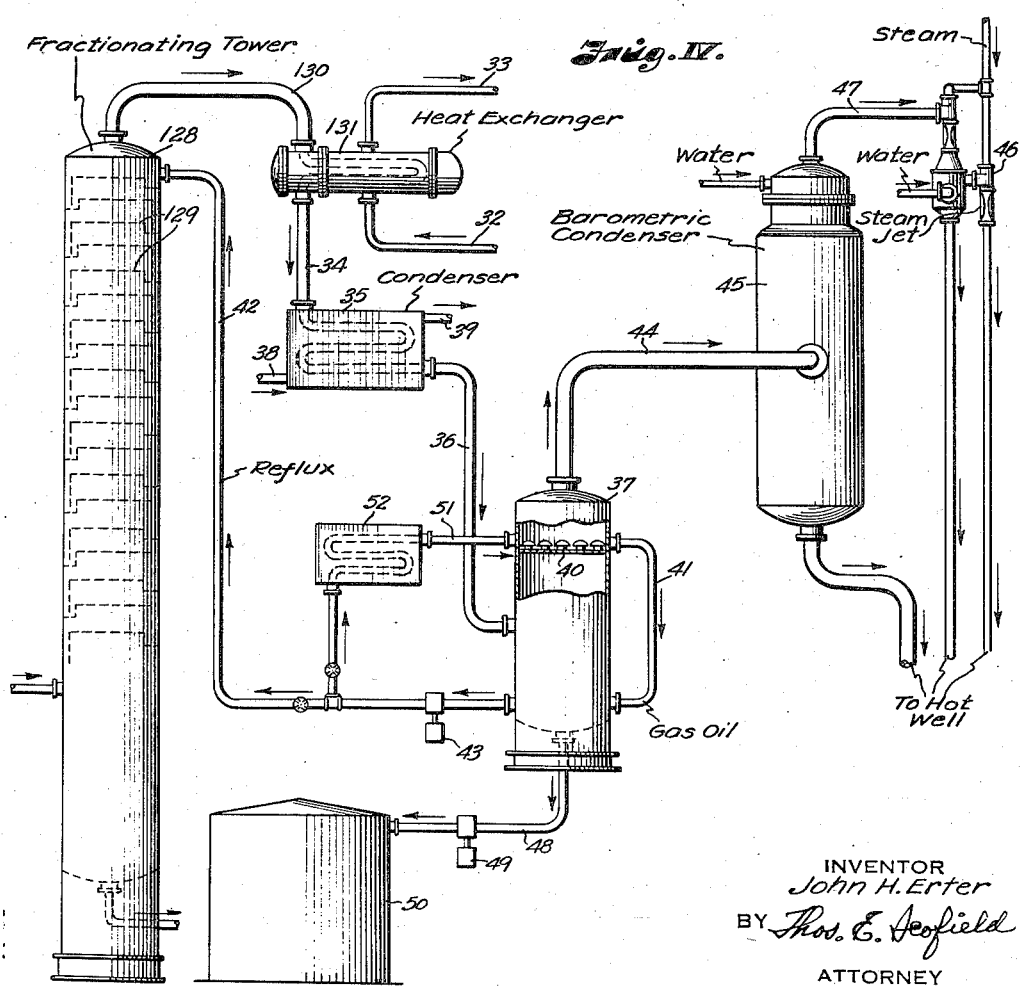
Fig. IV.
INVENTOR
John H. Erter
BY Thos. E. Scofield
ATTORNEY Patented June 21, 1938

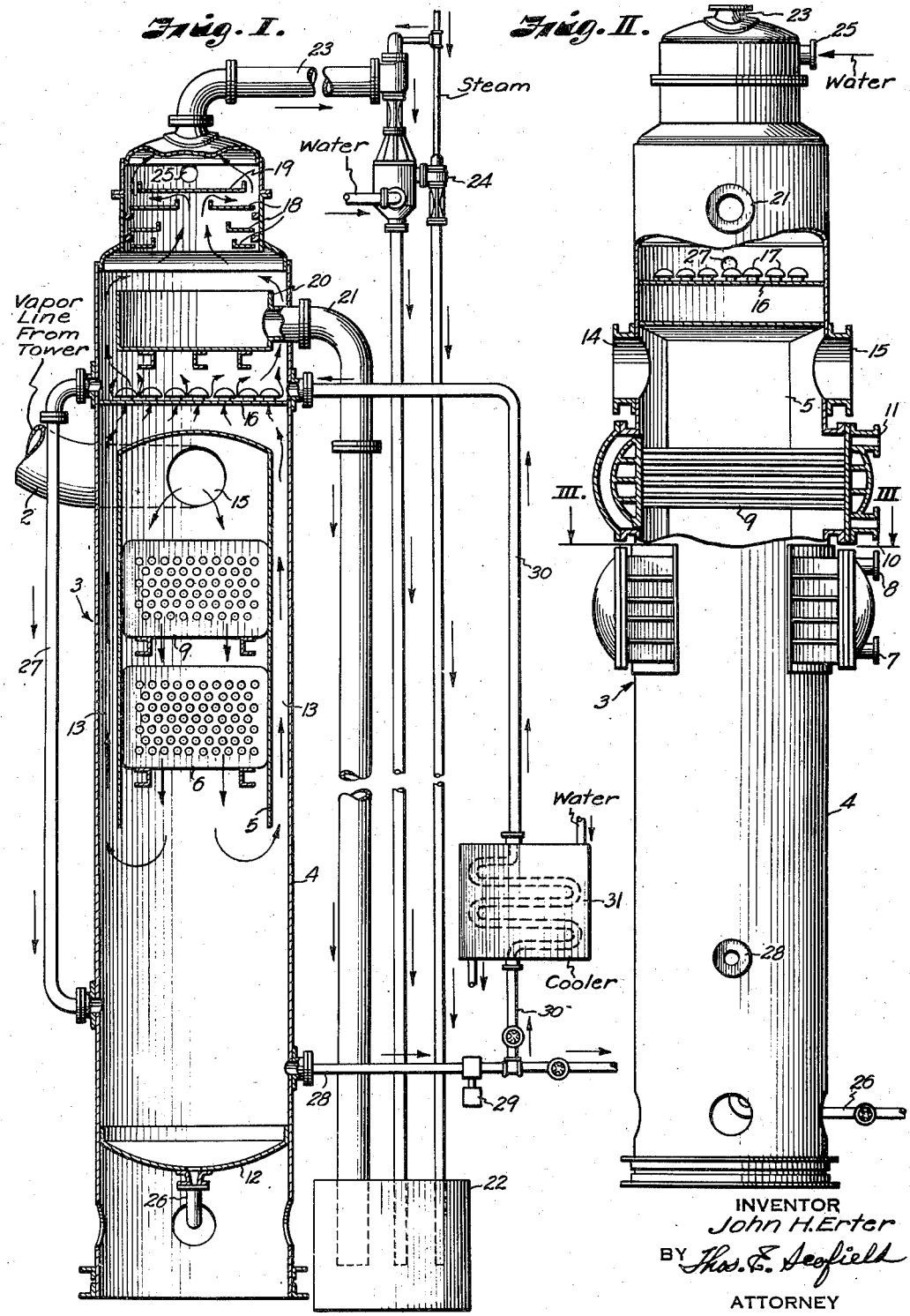

2,121,218

UNITED STATES PATENT OFFICE 2,121,218

CONDENSING METHOD AND APPARATUS

John H. Erter, White Plains, N. Y., assignor to Alco Products Incorporated, New York, N. Y., a corporation of Delaware Application March 31, 1934, Serial No. 718,397

7 Claims. (Cl. 196—77)

My invention relates to a condensing method and apparatus, and more particularly to a process and apparatus for separating steam from oil vapors.

It is known in the art to provide a unitary condensing system operating at sub-atmospheric pressure in which oil is condensed from a mixture of hydrocarbon vapors and steam.

The steam freed from the hydrocarbon vapors is subsequently condensed within the unit by means of a barometric condenser, the oil condensate and water then being removed from the unit as separate streams. In such a type of apparatus there is the disadvantage that minute particles of oil are entrained by the steam and removed with the water from the barometric condenser (or may be retained in vapor state). This leads to an appreciable loss of oil and fouling of the barometric condenser and associated apparatus.

It is an object of my invention to provide a process for removing entrained oil or hydrocarbon vapor from steam.

It is a further object of my invention to provide a process for reducing the oil losses incident to the separation of hydrocarbon vapors from steam.

It is a further object of my invention to provide a unitary condensing and separating apparatus for securing a maximum of oil separation from a mixture of hydrocarbon oil vapor and steam.

Other and further objects of my invention will appear from the following description and appended claims:

In the accompanying drawings which form part of the instant specification and are to be read in conjunction therewith:

Fig. I is a view in elevation partly in section of a preferred embodiment of my invention.

Fig. II is a side elevation of the embodiment disclosed in Fig. I.

Fig. III is a section taken along the line III—III of Fig. II.

Fig. IV is a schematic showing of a modification of the apparatus of my invention.

In general, I provide means for subjecting a mixture of hydrocarbon oil vapors and steam to heat exchange as a result of which the oil vapors are condensed and separated from the steam. The steam which has passed with the oil vapors over the heat exchangers at a relatively high velocity carries with it minute droplets of oil and some oil vapor which rise upward through separating means such as a bubble tray located above the heat exchangers. Steam in passing through the pool of condensate collected on the bubble tray is stripped of the entrained oil and oil vapors and then passes to a barometric condenser. The entire condensing unit is maintained at a sub-atmospheric pressure by means of a steam jet withdrawing the non-condensable vapors from the top of the unit. The discharged products from the jet and the water removed from the barometric condenser are led to a hot well. A withdrawal line is provided for removing accumulated condensate from the bubble tray and returning it to the oil condensed from the mixture of oil vapor and steam. This oil condensate serves also as a cooling medium for the oil pool on the bubble tray. A portion of the condensate is withdrawn, pumped through a cooler and then delivered to the tray.

In some forms of installation it may be desirable to separate the heat exchangers, separator and barometric condenser as I have shown in Fig. IV. In such a case the oil vapors and steam taken off from a fractionating tower are cooled whereby the oil is condensed and collected and the steam permitted to pass through a bubble tray for removal of the entrained oil particles and remaining hydrocarbon vapor. The oil-free steam is removed from the separator to an external barometric condenser operating in the customary manner. Provision is made in such case for returning a portion of the oil condensate to the top of the main fractionating tower to serve as reflux. In the practice of my invention it is necessary that the oil vapors have a boiling point above that of water in order that an effective separation of the oil and steam may be accomplished by the heat exchangers. Liquid hydrocarbons having a boiling range lower than that of gas oil are not suitable for the practice of the process of my invention since they would be condensed with or condensed after the steam. Provision is also made in this modification for returning a portion of the collected oil condensate after cooling to the bubble tray.

Referring now more particularly to Figs. I to III a mixture of gas oil vapors and steam from a fractionating tower is led through a line 2 to a unitary condensing system indicated generally as 3. This condensing system consists of a shell 4 within which is located a baffle means 5 open at the bottom. A heat exchanger 6 provided with cooling liquid inlet means 7 and liquid outlet means 8 is located adjacent the bottom opening of the baffle. A second heat exchanger 9 provided with a cooling liquid inlet means 10 and a liquid outlet means 11 is located above the heat exchanger 6 and in spaced relation thereto. A dished member 12 is secured within the shell 4 near the bottom portion thereof to form with the shell a collecting basin. The baffle 5 extends across the shell to form with it the passageways 13. The vapor line 2 is bifurcated adjacent the shell 3 and connected to the vapor inlet connections 14 and 15 fastened to the exterior of the shell 4 and leading to the interior of the baffle 5. A bubble plate 16 equipped with the customary bubble caps 17 is located above the closed top of the baffle 5 and secured to the sides of the shell 4. A series of annular rings 18 is arranged in superposed relation at the top of the shell 4 and above these rings is located a plate 19. The plate 19 and annular rings 18 are equipped with weir devices adjacent their peripheries to permit a flow of liquid downward through the shell. A receptable 20 is provided below the annular rings 18 and equipped with a withdrawal line 21 leading to a hot well 22. A vapor outlet line 23 is connected to the top of the shell 4 and to the thermocompressor and steam jet indicated generally as 24. A water inlet means 25 is provided adjacent to the top of the shell 4 and an oil withdrawal means 26 is provided adjacent the bottom of the shell. A withdrawal line 27 serves to connect the region directly above the bubble plate 16 with the bottom portion of the shell 4. Connected to the bottom portion of the shell 4 is a condensate withdrawal line 28 provided with a pump 29. A branch line 30 passes through a cooler 31 and is connected to the shell 4 directly above the bubble tray 16.

An example of the operation of my invention is as follows: A mixture of gas oil vapor and steam is fed through the line 2 to within the upper portion of the baffle 5 which directs the vapors downwardly over the heat exchanger 9 and the second heat exchanger or condenser 6. Cooling water fed to the heat exchanger 6 through the line 7 circulates through the tubes of the exchanger and is withdrawn through the line 8. This water may, if desired, be introduced through the line 10 and withdrawn through the line 11 or separate cooling water may be used. The oil vapors and steam are cooled in their passage over the heat exchangers and since the boiling point of the oil is higher than that of the water, the oil vapors will be condensed and collected in the bottom portion of the shell 4. The steam in which there is still a considerable amount of entrained oil particles and some oil vapor is directed upward through the passages 13 and passes through the bubble tray 16. A pool of oil is formed on this tray and the droplets of oil entrained by the steam are removed during the passage through the bubble tray. The level of this pool of oil is maintained constant by overflow through the pipe 27 to the bottom portion of the shell. The oil-free steam continues to rise upward and is condensed by the water flowing down over the trays 18 and 19 which has been introduced through the pipe 25. The cooling water and condensed steam collected in the tray 20 is removed through the line 21 and discharged to a hot well 22. The non-condensable vapors continue to rise upward and are removed from the upper part of the shell 4 through the line 23 as a result of the operating of the thermocompressor and steam jet 24 in a manner well known to those skilled in the art. The thermocompressor and steam jet discharge into the hot well 22. The oil condensed out of the steam is removed from the bottom portion of the shell 4 through the line 28 by means of the pump 29. A portion of this oil is pumped through the line 30 and cooler 31 and delivered to the upper surface of the bubble tray. A pool of oil which will be appreciably cooler than the vapors immediately below the tray is thus constantly maintained on the bubble tray. This pool functions as an absorption and condensation medium in removing the remaining oil droplets and oil vapors from the steam. It is to be observed that the steam after leaving the bubble tray will strike the undersurface of the collecting receptacle 20. The cooler surface of this receptacle may effect condensation of any oil vapor remaining in the steam.

Referring now to the modification of my invention as disclosed in Fig. IV, I provide a fractionating tower 128 equipped with the usual fractionating trays 129. A vapor drawoff line 130 serves to connect the top of the fractionating tower with the vapor entrance of a heat exchanger 131. A cooling liquid feed line 32 is connected to the heat exchanger 131 for the circulation of liquid within the heat exchanger. This liquid may be removed through the line 33. A line 34 serves to connect the heat exchanger 131 with a second heat exchanger or condenser 35 which is, in turn, connected by means of a line 36 to a separator 37. Cooling liquid is introduced to the condenser 35 through a line 38 and after circulation removed through the line 39. It is to be understood, of course, that the liquid discharge line from the condenser 35 may be connected to the cooling liquid input line to the heat exchanger 131 in order to secure a series operation of the two heat exchange units. The separator 37 is provided with a bubble tray 40 at its upper portion. A line 41 serves as an overflow for the liquid on the upper surface of the bubble tray and returns it to the lower portion of the separator 37. A reflux line 42 provided with a pump 43 is connected to the lower portion of the separator 37 and to the upper portion of the fractionating tower 128 above the uppermost fractionating tray. A vapor drawoff line 44 leads from the top of the separator 37 to a barometric condenser indicated generally as 45. A steam jet and thermo-compressor 46 of the type well known in the art is connected to the barometric condenser 45 by means of the line 47. A line 48 provided with a pump 49 is connected to the bottom-most portion of the separator 37 and may lead to a storage tank 50. The reflux line 42 has connected thereto at the outlet side of the pump 43, a branch line 51 which passes through a cooler 52 to the separator 37 just above the upper surface of the bubble tray 40.

An example of the operation of this modification of my invention is as follows: Hydrocarbon vapors having a boiling range of a gas oil distillate rise upward from the uppermost of the fractionating trays 129 and in conjunction with the stripping steam pass off overhead through the vapor line 130 to the heat exchanger 131. A mixture of oil vapors and steam in passing through the heat exchanger 131 are cooled as a result of the circulation of liquid through the lines 32 and 33. Some of the oil vapors are condensed and flow downward through the line 34 to the final condenser 35 wherein a substantially complete condensation of the oil vapors is effected as a result of the cooling action of liquid circulated through the lines 38 and 39. The gas oil condensate and steam is fed through the line 36 to the separator 37 in the bottom of which the gas oil collects. The steam with its entrained particles of liquid oil and some hydrocarbon vapor rises upward through the separator 37 and passes through the bubble tray 40 on which a pool of oil has been collected. The hydrocarbon oil vapor remaining and the particles of oil in the steam are removed therefrom by absorption and condensation during the passage through the pool of oil and the oil-free steam passes overhead through the line 44 to the barometric condenser 45 wherein it is condensed and discharged to a hot well not shown. The excess oil on the plate of the bubble tray 40 is continuously returned through the line 41 to the oil reservoir in the bottom of the separator. The oil in the separator may be removed as collected through the line 48 by means of the pump 49 and stored in the tank 50. The barometric condenser 45, the separator 37, condenser 35, heat exchanger 131, and the main fractionating tower 128 are maintained at subatmospheric pressure by means of the steam jet 46 operating in the usual manner. The oil pool maintained on the upper surface of the bubble tray 40 is constantly replenished with cool oil bled from the reflux line 42 through the cool oil feed line 51 from the cooler 52. The temperature drop through the bubble tray will be sufficient to effect condensation and absorption of the oil vapor and oil particles remaining in the steam rising upward through the bubble tray.

It will be observed that I have accomplished the objects of my invention and have provided a process and apparatus by which the oil losses incident to the separation of gas oil vapors from steam are appreciably decreased.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In combination, a shell, baffle means within said shell in spaced relation thereto whereby vapor passageways are formed with said shell, means forming a vapor inlet to said baffle means, heat exchange means within said baffle means, liquid distributing means arranged in said shell above said baffle, a receptacle below said distributing means for collecting liquid flowing downward from said distributing means, means for removing liquid from said receptacle, means formed in said shell for introducing liquid to said liquid distributing means, means formed in said shell for removing vapors therefrom, a bubble tray located between said collecting means and said baffle and means for feeding cooled liquid to said bubble tray.

2. A condensing system including in combination a shell, baffle means within the shell forming vapor passageways therewith, heat exchange means within said baffle means, means forming a condensate collecting receptacle in said shell below said heat exchange means, a barometric condenser mounted within said shell above said heat exchange means, a bubble tray located in said shell between said heat exchange means and said barometric condenser for separating entrained liquid particles from vapors rising therethrough and means for returning liquid from said bubble tray to said condensate collecting means out of contact with vapors rising to said bubble tray.

3. Apparatus for condensing vapors of low boiling liquids from a mixture of vapors of low boiling and high boiling liquids including in combination, heat exchange means, a separator, a conduit connecting said heat exchange means and said separator, a bubble tray in said separator above the regin of connection of said conduit to said separator, vapor outlet means connected to the upper portion of said separator, liquid outlet means connected to the lower portion of said separator, means for maintaining sub-atmospheric pressure connected to said vapor outlet means and an overflow pipe connected to said bubble tray, said overflow pipe having its inlet end connecting with said bubble tray for removing liquid therefrom and having its outlet end disposed to discharge liquid therefrom to below the region of connection of said conduit to said separator.

4. A process for recovering a hydrocarbon oil from a mixture of hydrocarbon oil vapors and steam comprising the steps of condensing the oil vapors and collecting the liquid oil, removing the steam from the collecting zone and passing the steam so removed through a separating zone, intimately contacting the steam in its passage therethrough with a liquid separating medium whereby entrained oil particles and oil vapor are removed from the steam, continuously removing a portion of the liquid separating medium from the separating zone, and returning the liquid to the collecting zone out of contact with steam passing to the separating zone, continuously adding cooled fresh liquid separating medium to the separating zone, condensing the oil-free steam vapor and removing the oil and water from the system.

5. The process of claim 4 in which the cooled fresh separating medium is taken from the collected oil condensate.

6. A process for recovering a hydrocarbon oil from a mixture of oil vapor and steam comprising the steps of condensing the oil vapor and collecting the oil condensate, removing the steam from the collecting zone and passing the steam through a separating zone, intimately contacting the steam in its passage through said separating zone with a cooler liquid whereby oil remaining in said steam is separated therefrom to produce substantially oil free steam, returning separated liquid oil to the oil collecting zone without contacting steam passing to the separating zone, condensing the oil free steam and removing collected oil and steam from the oil collecting and steam condensing zones, respectively.

7. A process for recovering oil having a boiling point higher than water from a mixture of the oil vapor and steam comprising the steps of cooling the mixture sufficiently to condense substantially all the oil vapor, collecting the oil condensate, passing the steam and remaining oil vapor through a body of cooler liquid maintained at a temperature such that substantially all the oil vapor will be separated from the steam by said cooler liquid, passing the steam issuing from said body of liquid through cooling water in a barometric condensing zone to condense the steam, separately withdrawing oil from the pool of liquid and substantially oil free water from the barometric condensing zone, respectively, cooling a portion of the first mentioned collected oil condensate, and returning the cooled condensate to the body of liquid through which the steam and remaining oil vapor is passed.

JOHN H. ERTER.